G. D. BAILEY & F. E. RICE.
BUILT-UP RELEASABLE CLUTCH MECHANISM.
APPLICATION FILED MAY 4, 1914.
1,189,774.
Patented July 4, 1916.
2 SHEETS—SHEET 2.
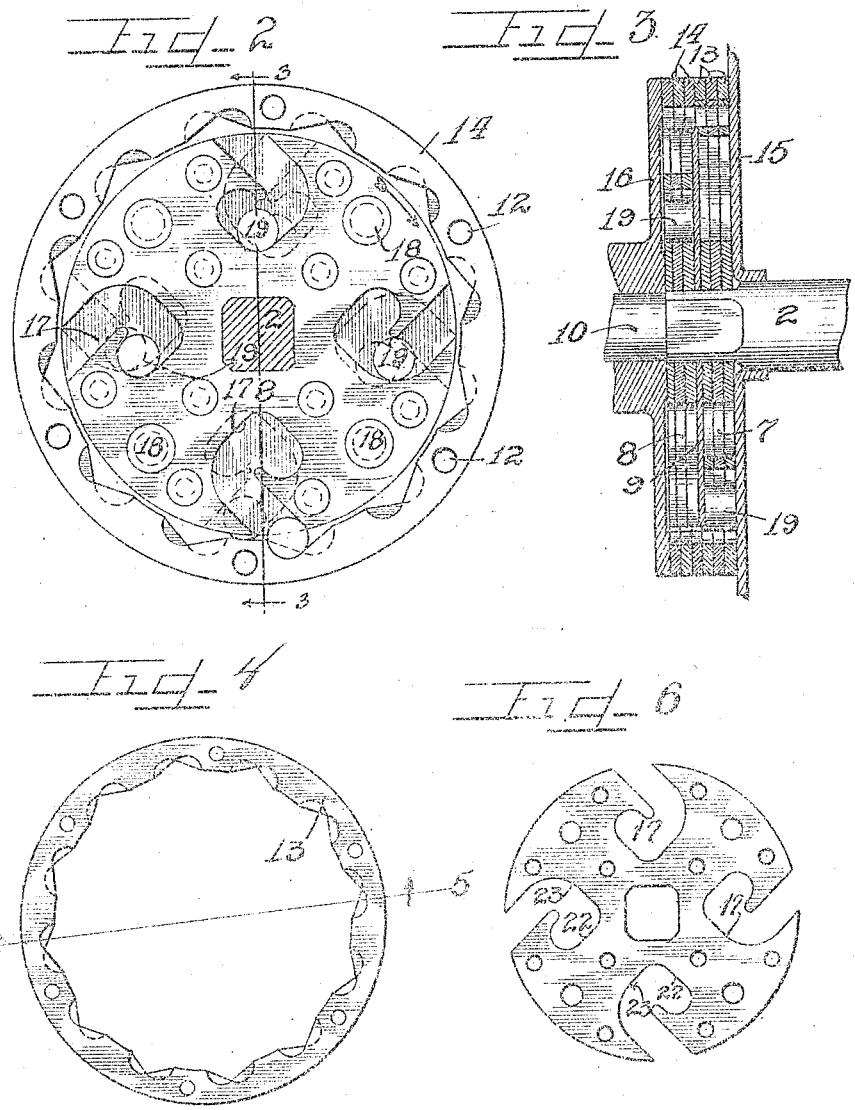

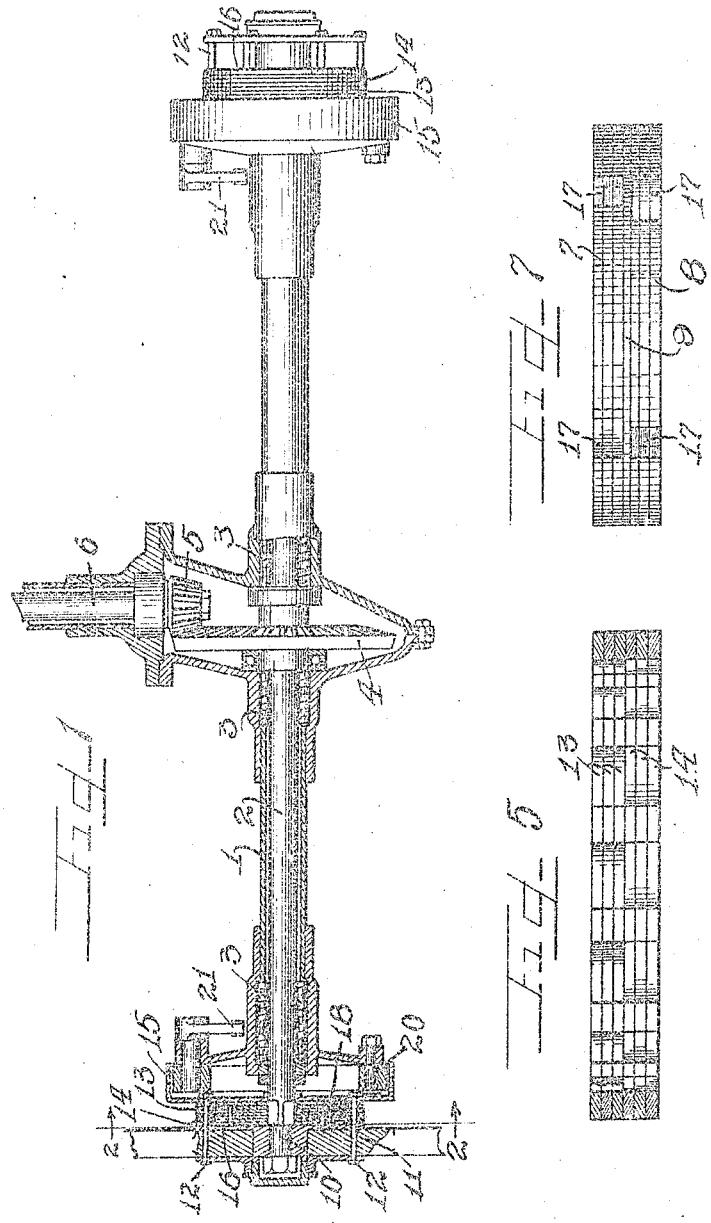

UNITED STATES PATENT OFFICE.

GEORGE D. BAILEY AND FRANK E. RICE, OF DETROIT, MICHIGAN, ASSIGNORS TO GEARLESS DIFFERENTIAL CO., A CORPORATION OF MICHIGAN.

BUILT-UP RELEASABLE CLUTCH MECHANISM.

1,189,774. Specification of Letters Patent. Patented July 4, 1916.

Application filed May 4, 1914. Serial No. 836,072.

*To all whom it may concern:*

Be it known that we, GEORGE D. BAILEY and FRANK E. RICE, citizens of the United States, and residents of the city of Detroit, in the county of Wayne and State of Michigan, have invented certain new and useful Improvements in Built-Up Releasable Clutch Mechanisms; and we do hereby declare that the following is a full, clear, and exact description of the same, reference being had to the accompanying drawings, and to the numerals of reference marked thereon, which form a part of this specification.

This invention relates to that class of devices set forth in the co-pending application for patent of George D. Bailey for "releasing clutches", filed July 27, 1912, Serial No. 711,801. This mechanism, when associated with an axle of a vehicle permits the drive to be differentially transmitted to the respective wheels, and yet obviates the defects found in an ordinary bevel gear differential.

It is a well known fact that serious accidents occur by the skidding of motor cars, and this is largely due to the fact that with the bevel gear differentials now in use on practically all types of motor cars, there is a tendency for the drive to be imparted to the wheel to which the least resistance of rotation is offered. Thus in use upon a slippery pavement or upon a turn, one of the wheels receives practically all the power, sometimes even a reverse rotation of the other wheel taking place, thus causing the dangerous skidding to occur.

In this invention the drive is always imparted to the wheel which rotates the slowest where a difference in speed exists, or to that wheel to which the most resistance to rotation is offered.

This invention has for one of its objects the construction of a device wherein the various parts are built up of stampings recessed to form pockets or guides to receive locking rollers therein. It is obvious that the power transmitted by the device is dependent upon the load it can safely carry, and of course the load is dependent upon the size or the area subjected to the pressures between the driving and the driven parts. By this invention it is possible to build up the device to any size desired whereby areas of sufficient size are provided for the parts which transmit the drive to the driven elements.

It is also an object of this invention to construct a releasable clutch mechanism wherein the cam, pawl carrying elements are formed of stampings which may be built up to any required thickness and likewise the ratchet means with which said mechanisms coact through the rollers may be similarly built up.

It is also an object of this invention to construct a device wherein the recesses provided to receive the rollers through which the drive is transmitted from the driving to the driven elements are of an improved form.

It is also an object of this invention to so arrange the parts as to prevent accidental interlocking thereof when the vehicle wheel overruns the axle or coasts on a turn.

It is a further object of this invention to construct sectional coacting elements of a releasing clutch mechanism which may be built up to the required size to carry the load or transmit the power for the particular purpose for which they are to be used from standard stampings interchangeable with one another.

It is finally an object of this invention to provide an improved construction for releasable clutches, permitting a clutch to be built up from stock stampings to suit any purpose for which it is designed.

The invention (in a preferred form) is illustrated in the drawings and hereinafter more fully described.

In the drawings: Figure 1 is a top view partly in section and partly in elevation of the rear driving axle of a motor car. Fig. 2 is an inner face view of one of the clutch mechanisms taken on line 2—2 of Fig. 1. Fig. 3 is a section taken on line 3—3 of Fig. 2. Fig. 4 is a front elevation of the detached ratchet ring elements of the device. Fig. 5 is a section on line 5—5 of Fig. 4. Fig. 6 is a front elevation of the recessed cam or roller carrying element detached from the device. Fig. 7 is an edge view of the assembled cam or roller carrying elements, shown in Fig. 2, detached from the device.

As shown in the drawings: The reference numeral 1, indicates as a whole a stationary housing in which a one piece axle 2, is journaled upon suitable roller bearings 3, disposed at the ends and near the middle thereof. A large bevel gear 4, is keyed upon said axle 2, and is driven from a small bevel pinion 5, meshing therewith and secured upon the end of a driving shaft 6, of the automobile. The axle, near its ends, is squared, and fitted rigidly thereon are the sectional cam or roller carrying members built up of stamped plates 7 and 8, respectively, with a parting or separating plate 9, disposed therebetween. The extreme outer ends of the axle 2, are round as denoted by the reference numeral 10, and journaled thereon are wheels 11, only a part of which is illustrated.

Rigidly secured to the wheels by means of bolts 12, are circumferential ratchet members or rings which fit concentrically around said cam or roller carrying elements, and these likewise are built up of a plurality of stamped sections denoted respectively by the reference numerals 13 and 14, with the teeth of the respective sections directed in opposite directions. A brake drum 15, is held by means of said bolts 12, against the inner surface of the ratchet members, and extends downwardly and is journaled upon the inner rounded portion of the axle 2, so that the cam or roller carrying members 7 and 8, of the clutch mechanism are confined between said brake drum 15, and a face plate 16, secured on the inner surface of the wheel.

Roller carrying recesses 17, are stamped in each of the sections 7 and 8, and when the cam or roller carrying member is built up, that is with said plates connected to one another by means of bolts 18, the slots in the plate 7, are directed oppositely to those in the plate 8, and similarly the ratchet teeth formed on the interior of the annular members 13, are directed in opposite directions to those of the members 14. Hardened steel cylindrical rollers 19, are placed in the recesses 17, and are of a length equal to the thickness of the respective assembled plates 7 or 8. An internal expanding brake 20, is mounted within each of said brake drums 15, on suitable extensions from the axle housing, and actuating levers 21, are provided for the purpose of operating the same.

The operation is as follows: When the axle is rotating in a direction to rotate the roller carrying or cam elements in the forward direction indicated by the arrow in Fig. 2, the lowermost of the rollers 19, travels outwardly in its slot and into engagement with one of the teeth of the ratchet ring 14, thus driving the ratchet ring and consequently the wheel therewith. It is obvious that in the event of a differential movement taking place between the rear wheels of the vehicle, for instance one wheel travels faster than the other, as in making a turn, that the ratchet ring may readily rotate away from its respective cam element and roller through which it has been receiving the drive. When the axle 2, is rotating in a forward direction indicated by the arrow in Fig. 2, that is with the respective assembled plates 8, of the roller carrying member driving the ratchet ring portion formed by the plates 14, the rollers contained in the other cam element formed by the plates 7, are retained in the inner ends of their recesses, owing to the fact that the recesses are directed in the opposite direction, so that centrifugal force and gravity do not throw the rollers into driving engagement. However, owing to the improved shape of the recesses 17, that is with the two wall portions 22 and 23, substantially at right angles to one another and the continuation thereof leading outwardly to the periphery of the roller carrying members, also substantially at right angles to the wall 23, there is no tendency for the rollers for a reverse drive moving outwardly to the end of their recesses, even at the highest speeds.

We have found by experiment in prior constructions that when the reverse driving members are disposed nearest the axle ends, that is, outside of the forward driving members, there is a strong tendency for the rollers of the reverse driving members to be moved into locking engagement when the outer wheel on a turn overruns the axle. The reason for this is that the rollers are forced laterally against the confining plate on the wheel, due to the centrifugal force brought into existence by the turning of the wheel on a curve, and consequently the confining plate, which is rotating faster than the roller carrying member, rolls the rollers outwardly in their slots. In the present invention we have obviated this difficulty by disposing the forward driving members outside of the reverse driving members so that the reverse driving rollers of the outer wheel which is making a turn, bear at their ends against the intermediate plate which, of course, always moves at the same speed as the roller carrying members. This difficulty does not come into play on the inner wheel on a turn, owing to the fact that the inner wheel is the driving wheel, and consequently the particular inner confining plate for the reverse driving rollers is moving at the same speed as the roller carrying member.

We are aware that various details of construction may be varied through a wide range without departing from the principles of this invention, and we therefore do not purpose limiting the patent granted otherwise than necessitated by the prior art.

We claim as our invention:

1. In a releasing clutch mechanism roller carrying cam members comprising sets of oppositely directed stamped recessed plates bolted together, a separating plate between the respective sets of oppositely directed recessed plates, and ratchet members formed of a plurality of plates bolted together and to a wheel of a vehicle.

2. In a device of the class described recessed roller carrying members built up of stamped plates, rollers in the recesses thereof of a length equal to the respective depths of the recesses determined by the number of plates assembled, and ratchet rings disposed around said roller carrying members comprising a plurality of stamped plates affording teeth to coact with said rollers to receive a drive from said roller carrying members through said rollers.

3. In a device of the class described the combination with sectional ratchet rings, of sectional built up roller carrying members and rollers disposed therein.

4. The combination with forward and reverse drive roller carrying members having rollers therein, of sectional built up forward and reverse drive ratchet rings to coact with the rollers to receive a drive from said roller carrying members.

5. In a device of the class described a cam element consisting of stamped recessed plates bolted to one another, a separating plate assembled therewith with the recesses in said stamped plates on each side thereof directed oppositely, and annular ratchet members having two rows of teeth, one row directed oppositely to the other to coact with the respective separated portions of the cam element to receive or transmit a drive therebetween.

6. In a device of the class described laminated roller carrying members having sets of recesses therein faced in opposite directions to receive rollers, each of said recesses comprising a plurality of passages at right angles to one another, and a projection forming the walls of certain of said passages and a pocket to retain a roller therein.

7. In a device of the class described sectional built-up roller carrying elements for forward and reverse drive, each of said elements having a series of oppositely directed recesses therein, sectional built-up ratchet rings for co-action with said elements, and cylindrical rollers carried by said elements in the recesses therein to permit interlocking of said rings with said elements to effect a drive therebetween.

In testimony whereof we have hereunto subscribed our names in the presence of two subscribing witnesses.

GEORGE D. BAILEY.
FRANK E. RICE.

Witnesses:
CHARLES W. HILLS, Jr.,
FRANK K. HUDSON.